Patented May 3, 1938

2,116,131

UNITED STATES PATENT OFFICE 2,116,131

DIAZO SALT PREPARATIONS

Max Wyler, Blackley, Manchester, England, assignor to Imperial Chemical Industries Limited, a corporation of Great Britain No Drawing. Application November 18, 1935, Serial No. 50,477. In Great Britain November 22, 1934

8 Claims. (Cl. 260—69)

This invention relates to new solid diazo salts and the process of their production.

The invention has as an object the formation of solid diazo salts which, by virtue of their good solubility, stability and coupling power, are valuable for application in certain dyeing and printing processes, for example, the so-called "ice-color" process.

Various aromatic sulphonic acids have been applied in the making of solid stable diazo salts. The sulphonic acids hitherto technically useful for this purpose are limited in number and do not always yield stable diazo salts which are readily isolated or which have satisfactory stability or solubility with all the diazotized amines it is desired to use commercially in such a stable, solid form. We have now found a means whereby desirable, new, well crystallized, solid, stable diazo salts may be obtained.

The invention comprises interacting an aqueous solution containing a diazotized aromatic amine which is devoid of sulphonic or carboxylic groups with a sulphonic acid, or a water-soluble salt thereof, of the general formula

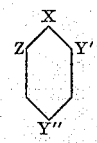

where X is a hydroxy or methoxy group, Y' and Y'' represent a sulphonic group or chlorine, Y' and Y'' being different groups, and where Z is hydrogen or methyl. By this means well crystallized salts, namely the diazonium 2-chlorophenol-4-sulphonates, 4-chlorophenol-2-sulphonates, chloroanisole-, chlorocresol- or chlorocresolmethylether sulphonates, are formed. The present invention is particularly applicable for example, to those diazotized aromatic amines which are used in "ice-color" processes. Some of these amines are indicated in the example and table hereinafter given. Diazotized amines which already contain an azo group have been applied in "ice-color" processes and may also be used in the present invention.

Various ways of carrying the invention into effect will be clear to the skilled technician. For example, the unsulphonated substituted amine is dissolved or suspended in a quantity of a suitable mineral acid of correct concentration to facilitate diazotization. Nitrous acid or a substance capable of generating nitrous acid in such an acid medium is added, while the factors of temperature, agitation, and rate of addition are controlled to secure diazotization. These steps are well understood in the art. To the solution of diazonium salt thus resulting is added with proper control of temperature, agitation, and rate of addition: (1) a sufficient quantity of a solid sulphonic acid as hereinbefore defined to precipitate the diazo salt; or (2) a like quantity of a suitable solid metal salt of the said sulphonic acid as above described; or (3) a like quantity of an aqueous solution of the said sulphonic acid as above described; or (4) a like quantity of an aqueous solution of a suitable metal salt of the said sulphonic acid as above described. The solid diazo salt which thus results is filtered off and dried under conditions which will not cause its decomposition.

Obviously, when desirable, the diazo salts may alternatively be formed by diazotizing the amine in an aqueous solution containing the required amount of a sulphonic acid or a salt thereof as defined above.

The new diazo salts formed as described above are readily isolated in good yields. They can be dried without decomposing at moderately raised temperatures (for instance from 50° C. to 60° C.) to give crystalline powders varying from white to brown in color. In the solid form and at ordinary temperatures they are stable for indefinite periods of time and darken only slowly on exposure to strong daylight. In most cases they dissolve in warm methanol from which beautiful crystallizations can be effected. The new stable diazo salts dissolve readily in water and are very suitable for use in the coloring of textile fabrics by "ice-color" processes.

The new salts may be applied to the fabric by any of the methods commonly employed in the dyeing and printing arts. For example, cotton yarn may be impregnated with the anilide of 2-hydroxy-3-naphthoic acid by immersion in a water solution of the sodium salt of this compound. This impregnated yarn is then placed in a solution of one of these diazo salts when the color is immediately produced on the fibre. In the printing art, cotton piece goods is impregnated with an arylide of 2-hydroxy-3-naphthoic acid, dried and subsequently printed with a prepared paste of one of these diazo salts. The color is then developed in the usual manner and the excess of the arylide removed by washing.

It will be understood that, in employing the solid salts described herein, in order to meet the particular conditions or requisites of a given dyeing or printing operation, it may be advisable to add to the salt preparation any of the well known substances ordinarily employed in this art, such as, for example, sodium chloride, sodium sulphate, sodium bicarbonate, aluminium sulphate, or potassium aluminium sulphate, or a mixture of these salts.

To illustrate the invention the following example, in which the parts are by weight, is given. It is to be understood that the invention is not limited to the specific reagents, proportions or operating conditions therein disclosed.

*Example*

16.1 parts of 2,5-dichloroaniline, dissolved in 300 parts of water and 60 parts of hydrochloric acid (36° Tw.) are diazotized at 10° C. in the usual way by adding 6.9 parts of sodium nitrite. To the so-obtained diazo solution (filtered if necessary) 24.8 parts of potassium 2-chlorophenol-4-sulphonate (as crushed 80% technical material containing also potassium chloride) are added with stirring. The new diazonium salt begins to crystallize immediately and continues until the yield is almost that calculated from theory. The salt is filtered off after some hours, pressed and dried at 50° C. It is then a pale yellow crystallized powder. It dissolves readily in cold water.

From other amines similar diazonium salts are similarly obtained. The aqueous solubility of the salts so-formed will vary according to the diazotized amine and the particular sulphonic acid used. In cases where the solubility of the stable salt is very high it will be necessary to use the diazotized amine solution (e. g. diazotized aniline) in as high concentration as possible if the highest yield of stable salt is to be isolated.

Further illustration of stable diazo salts which may be obtained according to the invention are given in the following table:—

| Amine diazotized | Precipitated with— | Nature of dry diazonium salt obtained |
|---|---|---|
| 5-chloro-2-toluidine | Potassium-2-chlorophenol-4-sulphonate, one molecular proportion. | Pale buff crystals. |
| 4-chloro-2-toluidine | do | Do. |
| p-Nitroaniline | do | Deep yellow crystals. |
| 1-naphthylamine | do | Pale brown crystals. |
| Benzidine | Potassium-2-chlorophenol-4-sulphonate, 2 molecular proportions. | Yellow crystals. |
| Aminoazotoluene (from o-toluidine). | Potassium-2-chlorophenol-4-sulphonate, one molecular proportion. | Dark red crystals. |
| 3-nitro-4-toluidine | do | Yellow crystals. |
| 4-nitro-2-toluidine | do | Pale yellow crystals. |
| 5-nitro-2-toluidine | do | Very pale buff crystals. |
| 6-chloro-2-toluidine | do | Do. |
| 3-chloroaniline | do | Pale pink crystals. |
| 5-nitro-2-anisidine | Potassium-4-chlorophenol-2-sulphonate. | Buff crystals. |
| Aniline | Potassium-2-chlorophenolsulphonate. | Pale pink crystals. |
| o-Nitroaniline | Potassium-2-chloroanisol-4-sulphonate. | Pale yellow crystals. |
| 4-chloro-2-toluidine | Potassium-5-chloro-o-cresolsulphonate. | Yellow crystals. |
| o-Nitroaniline | 3-chloro-o-cresol-5-sulphonic acid. | Orange crystals. |
| Do | 3-chloro-o-cresol-methyl-ether 5-sulphonic acid. | Do. |
| Do | 5-chloro-o-cresol-3-sulphonic acid. | Yellow crystals. |
| Do | 5-chloro-o-cresol-methyl-ether-3-sulphonic acid. | Do. |

I claim:
1. The compound represented by the formula

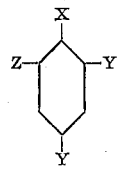

in which X is one of the group consisting of hydroxy and methoxy, Z is one of the group consisting of hydrogen and methyl, one Y is chlorine and the other Y is the group

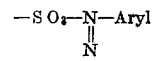

2. The compound represented by the formula

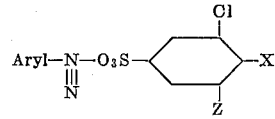

in which X is one of a group consisting of hydroxy and methoxy, and Z is one of a group consisting of hydrogen and methyl.

3. The compound represented by the formula

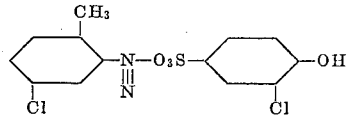

4. The compound represented by the formula

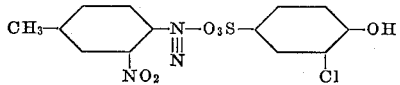

5. The process which comprises reacting in mineral acid medium diazotized 3-nitro-4-toluidine with potassium-2-chlorophenol-4-sulfonate.

6. The process which comprises reacting in mineral acid medium diazotized 4-chloro-2-toluidine with potassium-5-chloro-ortho-cresol-sulfonate.

7. The process which comprises reacting in mineral acid medium diazotized 4-chloro-2-toluidine with potassium-2-chlorophenol-4-sulfonate.

8. The sulphonic acid salt substantially identical with that which may be formed by combining in a reaction medium comprising about 60 parts of hydrochloric acid (36° Tw.) and 300 parts of water a diazotized primary aromatic amine which is free from sulphonic and carboxylic acid groups, with one of the group consisting of a sulphonic acid and a water-soluble metal sulphonic acid represented by the formula

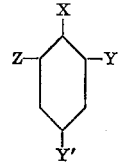

in which Y and Y' are different members of the group consisting of sulphonic and chlorine, X is one of a group consisting of hydroxy and methoxy, and Z is one of a group consisting of hydrogen and methyl.

MAX WYLER.